United States Patent

Austin, Jr. et al.

[11] Patent Number: 5,249,881
[45] Date of Patent: Oct. 5, 1993

[54] TELESCOPING ARM APPARATUS

[75] Inventors: George K. Austin, Jr., Newberg; J. Rick Halbirt, Hubbard, both of Oreg.

[73] Assignee: A-Dec, Inc., Newberg, Oreg.

[21] Appl. No.: 855,200

[22] Filed: Mar. 20, 1992

[51] Int. Cl.$^5$ ............................................. F16B 7/10
[52] U.S. Cl. .................................. 403/378; 403/377; 403/365; 403/109
[58] Field of Search ........ 403/365, 104, 109, 376-380, 403/372, 112, 364, 360, 366; 52/726, 118; 248/188.5, 336, 337; 285/302

[56] References Cited

U.S. PATENT DOCUMENTS

| | | | |
|---|---|---|---|
| 2,542,967 | 2/1951 | Waechter | 248/188.5 |
| 3,430,994 | 3/1969 | Keller, II | 403/372 |
| 3,539,185 | 11/1990 | Andis | 248/188.5 X |
| 4,174,900 | 11/1979 | Ina | 248/337 X |
| 4,629,078 | 12/1986 | Korty | 403/372 X |
| 4,649,679 | 3/1987 | Arens | 403/364 X |
| 4,685,751 | 8/1987 | Düpree | 403/381 X |
| 4,733,911 | 3/1988 | Fulcheri | 248/188.5 X |
| 4,932,622 | 6/1990 | Hayakawa | 248/188.5 |
| 4,997,307 | 3/1991 | Schmanski | 403/372 X |
| 5,069,570 | 12/1991 | Pryor et al. | 403/109 |
| 5,152,627 | 10/1992 | Arnold | 403/109 |

OTHER PUBLICATIONS

Promotional literature showing unit No. 2046 with Telescoping Arm Assembly No. 42-0608-00, p. 38 of A-Dec ® Equipment Catalog, Sep., 1991.
Engineering drawing of Telescoping Arm Assembly No. 42-0608-00, unpublished.

*Primary Examiner*—Randolph A. Reese
*Assistant Examiner*—Harry C. Kim
*Attorney, Agent, or Firm*—Klarquist, Sparkman, Campbell, Leigh & Whinston

[57] ABSTRACT

A telescoping arm has a rod slidable within a sleeve defining an interior bore. A bushing attached to the rod slides within the bore and has a substantially rigid block constrained by the bore against substantial rotation or lateral movement. The bushing further includes a spring portion biased against the sleeve to provide frictional resistance to telescoping of the apparatus and to prevent the bushing from rattling in the bore. The spring responsively accommodates small lateral and rotational forces, while the block bears more substantial loads.

17 Claims, 1 Drawing Sheet

TELESCOPING ARM APPARATUS

This invention relates to telescoping arms.

BACKGROUND AND SUMMARY OF THE INVENTION

Telescoping arms are useful in innumerable applications for holding objects at selectable positions. A telescoping arm typically has an outer sleeve with an inner rod coaxially positioned within. The inner rod slides so that an exposed portion of selectable length extends from the sleeve to provide a variable overall length. Generally, frictional forces between the rod and the sleeve hold the apparatus in the selected position. Sometimes, internal locking or braking mechanisms may be used for this purpose.

Typical telescoping arm assemblies require close manufacturing tolerances if they are to carry loads and have a smooth sliding action. While sliding rods and attached bushings may easily be manufactured to precise tolerances, the sleeve interior is more difficult to control dimensionally. An added manufacturing step may be required to drill the sleeve to form a precise bore; more complicated machining may be required if the bore is to have a non-circular cross-section.

As an alternative to precisely machined rigid components, conventional telescoping arms may include compliant or abradable bushings to accommodate low tolerance sleeves, such as those produced by an extrusion process. A compliant bushing for such an assembly typically has several compressible points that extend radially from the bushing in a star shape. The points are compressed or abraded as the bushing is installed in the sleeve. As the bushing transmits lateral loads, the star points are subject to further deformation, which results in a progressively loosening action over the life of the apparatus. The small load-bearing area of the bushing wears at an accelerated rate in any case.

The present invention provides a bushing for a telescoping arm having a rod coaxially received in a sleeve. The bushing is constructed with a rigid body portion that is closely but loosely received to slide within the sleeve. Flexible spring portions attached to the bushing body are biased against the sleeve interior to provide a controlled frictional resistance to sliding, and a resistance to lateral vibration under small loads. When there is a clearance gap between the bushing body and the sleeve, the springs flex in response to moderate loads until the body portion contacts the interior of the sleeve to bear larger loads. The substantially rigid body portion limits the range of spring flexing to prevent permanent deformation or damage to the springs.

The apparatus has an extended product life, over which the action and frictional resistance of the apparatus remains relatively constant due to the limited force applied to the spring contact points. In addition, because the springs are initially flexed to bias against the sleeve, minor surface wear at the spring contact points will not appreciably reduce the biasing force. As a result, the present invention has a low manufacturing cost and a consistently smooth action throughout its life.

DETAILED DESCRIPTION OF A PREFERRED EMBODIMENT

Figure 1:
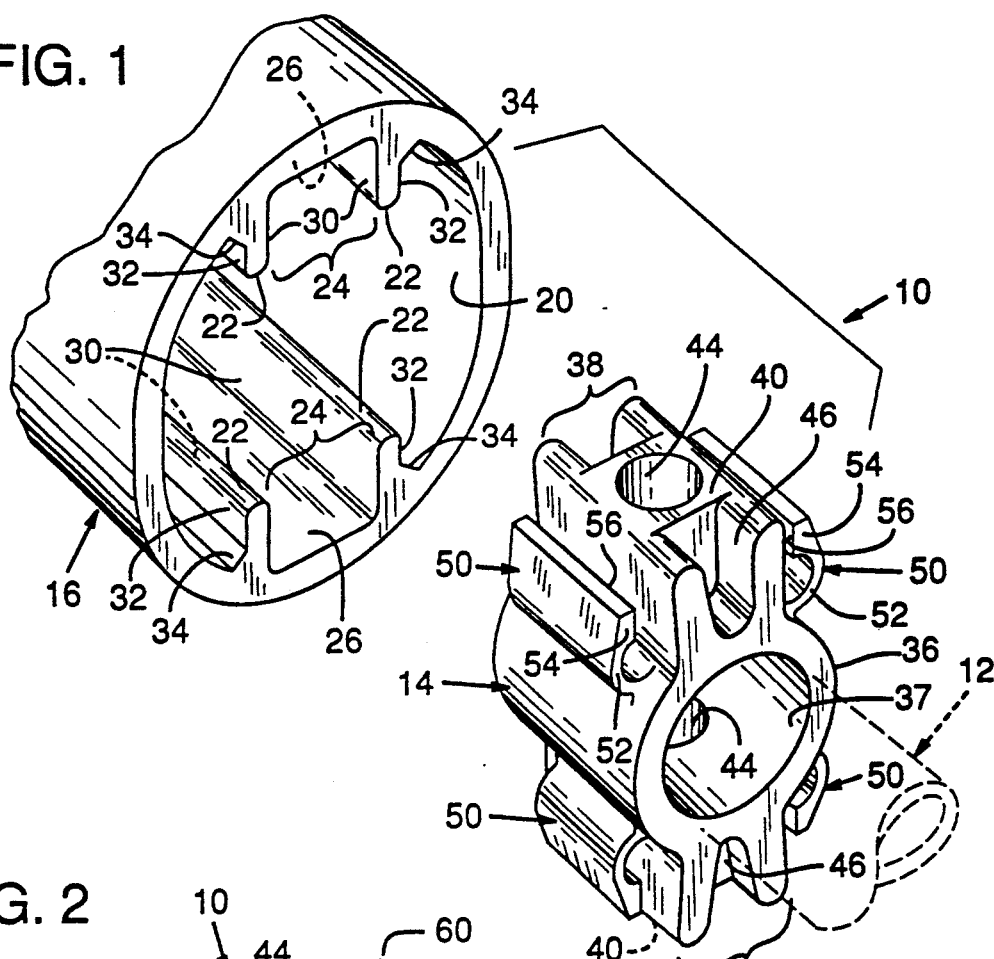
FIG. 1 is an exploded perspective view of an apparatus constructed in accordance with the invention.

FIG. 1 shows an telescoping arm apparatus 10 including a cylindrical elongated tube or rod 12, a bushing 14 securely mounted to an end of the rod, and a sleeve 16 coaxially aligned with the rod 12 and defining an interior bore 20 configured to receive the bushing 14 so that the rod may be reciprocated in a controlled sliding path. The rod 12 is coaxially maintained where it exits the sleeve 16 by an end cap (not shown) inserted in the sleeve end, with the cap defining a bore sized to closely and slidably receive the rod 12.

The sleeve 16 is preferably extruded of aluminum, although other rigid materials may be substituted. The extrusion process is generally not well controllable to provide tight manufacturing tolerances, although complex shapes may be formed at low cost. Accordingly, dimensions of the sleeve will vary somewhat between a minimum or minimum material condition, and a maximum or maximum material condition.

The illustrated embodiment has a nearly circular, oblong exterior profile, although a wide range of alternatives may be used. The interior profile of the bore 20 is also generally oblong, but with opposed pairs of guide rails 22 protruding inwardly into the bore. The rails 22 of each pair are parallel and spaced apart to define a rectangular trough 24 having a selected trough width. The base of each trough 24 is defined by a base wall 26, with the base walls of the respective troughs being opposed parallel surfaces. Each rail 22 has an inwardly facing surface 30 that faces the paired counterpart rail, and an outwardly facing surface 32 facing away from the trough 24. A sloped ramp 34 forms the outer surface of rail 22 at the root thereof so that the rails are widest at their bases.

The bushing 14 is a precisely formed, injection molded plastic part preferably formed of nylon filled with a dry lubricating material, such as molybdenum disulfide (MoSz). Any material providing rigidity in large sections and durable elasticity in thin sections may be substituted. The bushing 14 is an integrally molded unit with a central cylindrical body 36 defining a central bushing bore 37 sized to closely receive the rod 12. A pair of substantially rigid, generally rectangular wings or blocks 38 extend distally from opposite sides of the body 36. The blocks 38 have a width at their distal ends slightly greater than at their junction with the body 36, and generally equal to the width of the trough 24, to provide a limited gap or limited interference with the trough.

The blocks 38 have opposed distal end surfaces 40 that are generally parallel and spaced apart by a distance less than the distance between the base walls 26 of the trough 24 in sleeve 16. The bushing is preferably molded with a medial parting line in a plane perpendicular to the axis of the bore. Consequently, a draft angle of approximately 3 degrees defines a reverse-tapered profile of the end surfaces 40, which facilitates installation of the bushing into the bore in either orientation.

The bushing 14, therefore, will be constrained within a narrowly limited range of lateral and rotational movement or play when it is installed in the sleeve 16, with the blocks 38 occupying the troughs 24. A dowel pin hole 44 is centrally defined in each end surface 40 on a single axis perpendicular to the central bushing bore 37. Attachment means may be provided by a conventional dowel pin 42, which may be installed in the hole 44 to penetrate a transverse hole in the rod 12 for secure attachment of the bushing 14 to the rod 12. Thus, the pin is captured by the sleeve when the bushing is installed in the sleeve. Each block 38 further defines a V-shaped pocket 46 on either side of the dowel pin hole 44 to facilitate molding, to reduce material cost, and to facilitate compression of the block when there is an interference fit inside the trough.

A spring portion 50 extends generally outwardly from the bushing body 36 on each side of each block 38 and generally parallel thereto to function as a small cantilever arm or leaf spring. Each spring 50 has a flexible curved neck portion 52 with a thin cross-section proximate to the bushing body 36 and a thicker toe section 54 extending distally from the body and adjacent the block 38. Each toe 54 has an inner surface 56 facing the block 38 and spaced apart from the opposed toe interior surface 56 of the corresponding spring 50 on the opposite side of the block. The distance between the opposed toe surfaces 56 is less than the distance between the outwardly facing surfaces 32 of a pair of rails 22 in the sleeve 16. Thus, the springs are deflected apart by the overall width of the pair of sleeve rails 22 when the bushing is installed in the sleeve.

Figure 2:
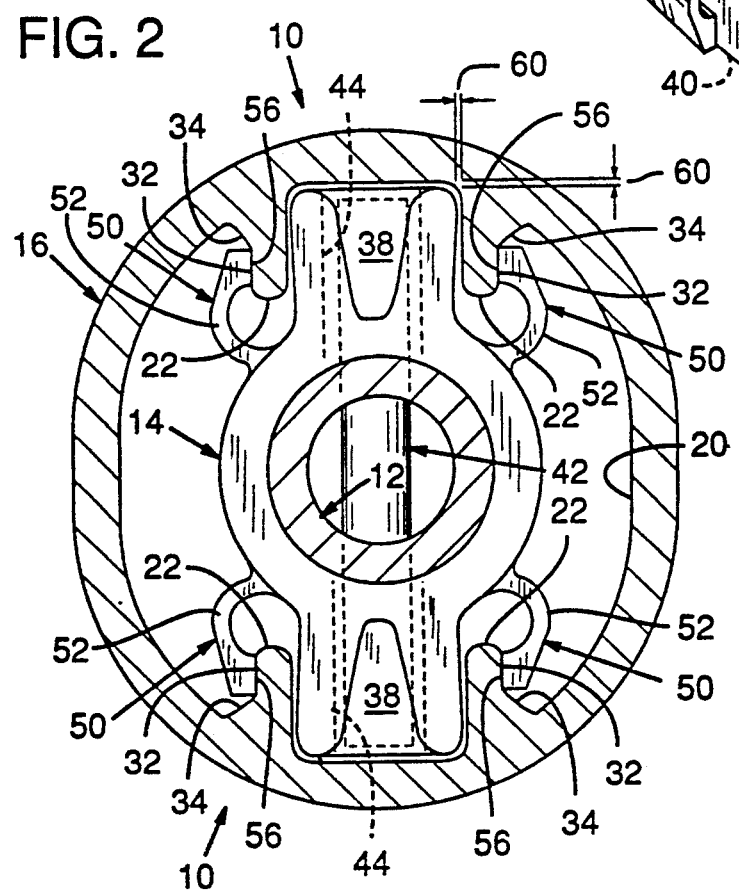
FIG. 2 is an axial cross-sectional view of the apparatus of FIG. 1.

As shown in FIG. 2, the bushing 14 and rod 12 are installed in the sleeve bore 20 so that each block 38 is received between each pair of rails 22 in the trough 24 defined therebetween. As illustrated, a small tolerance gap 60 may provide clearance on all sides between each block 38 and the sleeve 16 to permit the blocks 38 to slide freely in the sleeve. Lateral or rotational free play is limited by the gap width, if any.

When the troughs 24 are at their narrowest in a maximum material condition, the distal ends of the blocks 38 may be slightly crushed to accommodate any interference. Slight crushing occurs without impairing smooth sliding operation because of the nearly point contact at the ends of the blocks resulting from their reverse-tapered profile, and because the diameter of the dowel pin hole 44 is substantially larger than that of the dowel pin at the end of each block.

The toe inner surfaces 56 of the deflected springs 50 are biased against the outwardly facing surfaces 32 of the rails 22. Even in a minimum material condition, the springs are biased with a biasing force sufficient to prevent vibration and rattling of the bushing within the sleeve and to provide a smooth frictional resistance to the sliding action of the arm. To prevent substantial lateral offset in line with the dowel pin 42 axis, the springs 50 encounter the rail ramps 34, which force the springs apart to resist the offset and to return the bushing to a centered position.

The springs 50 are all symmetrically and oppositely configured to provide biasing forces that are balanced. Consequently, the bushing 14 remains generally centered within the bore 20 when no load is applied to the bushing. When a substantial lateral or rotational load is applied to the bushing, the appropriate springs 50 will flex a limited amount until the rigid blocks 38 contact the sleeve 16 to bear any increased loads. Because the springs are resilient and are not required to flex a substantial distance, they are not deformed or damaged even by substantial loadings.

Having illustrated and described the principles of the invention by what is presently a preferred embodiment, it should be apparent to those persons skilled in the art that the illustrated embodiment may be modified without departing from such principles. Such modifications may result in an apparatus according to the invention which is very different in appearance from the illustrated embodiment. For instance, instead of each block riding in a trough formed by the sleeve, a single rail may penetrate a groove in each block to provide rotational and lateral alignment. Alternatively, the sleeve itself may be formed in any non-circular shape to accommodate a compatible bushing, such as a square sleeve and bushing. In other alternative embodiments, the springs may contact any portion of the sleeve to provide frictional resistance, and may be biased outwardly away from the blocks or radially away from the center of the bushing. The springs need not be integral with the bushing and may be positioned on only one side of the bushing in an unbalanced manner. Also, the components of the apparatus may be produced from a wide variety of suitable materials using a variety of manufacturing processes.

In view of the many possible embodiments to which the principles of our invention may be put, it should be recognized that the detailed embodiment is illustrative only and should not be taken as limiting the scope of our invention. Rather, we claim as our invention all such embodiments that may come within the scope and spirit of the following claims and equivalents thereto.

The invention claimed is:

1. A telescoping arm comprising:
   a sleeve defining an interior bore;
   a rod having an axis and slidable within the sleeve; and
   a bushing attached to the rod and slidably received within the bore, the bushing having
   a block having external dimensions at least slightly smaller than the sleeve bore such that it is slidably received therein, the block having a surface portion configured to directly contact the sleeve bore in any direction perpendicular to the rod axis in response to a lateral force on the block from any lateral direction to prevent substantial movement in all lateral directions between the bushing and the sleeve and to guide the rod within a controlled sliding path within the bore, the block including an outwardly protruding portion extending to a first radius from the axis of the rod, and the sleeve including an inwardly protruding portion spaced apart from the axis of the rod by a second radius less than the first radius, such that the outwardly protruding portion interferes with the inwardly protruding portion to prevent unlimited rotation of the bushing about the rod axis within the sleeve, the bushing also having
   a first flexible spring portion comprising a cantilever arm extending away from the block, the first spring portion having a first toe portion biased with a biasing force in a first direction about the axis against a first portion of the sleeve, and a second flexible spring portion comprising a cantilever arm extending away from the block, the second spring portion having a second toe portion biased with a biasing force in second direction about the axis opposite the firs direction against a second portion of the sleeve of resisting movement between the sleeve and the rod, each spring portion further having an elongated neck portion extending between the block and the toe portion such that the biasing forces flex the neck portions and laterally displace the toe portions in opposite direction.

2. The arm of claim 1 wherein the spring portions are arranged such that the biasing forces are balanced to substantially center the block within the sleeve.

3. The arm of claim 1 wherein the cantilever arms are integral with the bushing and extending therefrom to contact the sleeve.

4. The arm of claim 1 wherein the bushing is sized to fit within the bore with a tolerance gap between the block and the bore to permit the block to accommodate variations in the bore dimensions.

5. The arm of claim 4 wherein the spring portions resist flexing in response to small lateral forces such that the bushing does not rattle in the sleeve.

6. The arm of claim 1 defining a gap between the block and the sleeve having a limited gap width such that the block bears against the sleeve in response to a substantial lateral force while the spring portions flex only an amount limited to the gap width.

7. The arm of claim 1 wherein the sleeve includes at least one longitudinal guide rail projecting inwardly into the bore.

8. The arm of claim 7 wherein the surface portion of the block is configured to slide along the guide rail.

9. The arm of claim 7 wherein the spring portions contact the guide rail.

10. The arm of claim 1 wherein the bushing defines an attachment hole for receiving the rod such that the rod is coaxial with the sleeve.

11. The arm of claim 1 wherein the sleeve is an extrusion having a generally constant cross sectional profile.

12. The arm of claim 1 wherein the block is substantially rigid such that it does not flex or collapse under a lateral load.

13. The arm of claim 1 wherein the external surface portion is configured to directly contact the sleeve bore in response to rotation of the block.

14. The arm of claim 1 wherein the first and second portions of the sleeve contacted by the spring portions comprise inwardly protruding portions spaced apart from the axis of the rod by a radius less than the radius to which the spring portions extend from the axis of the rod.

15. The arm of claim 1 wherein each said toe portion includes a toe face contacting the sleeve and facing in a direction offset at an angle from a line extending radially from the rod axis, such that the toe faces do not face radially away from the rod axis.

16. The arm of claim 15 wherein each said toe portion includes a back side opposite the toe face and spaced apart from the sleeve by a gap such that the spring portion may freely flex toward the direction of the back side.

17. A telescoping arm comprising:

a sleeve defining an interior bore;

a rod having an axis and slidably within the sleeve; and a bushing attached to the rod and slidably received within the bore, the bushing having a block having external dimensions at least slightly smaller than the sleeve bore such that it is slidably received therein, the block having a surface portion configured to directly contact the sleeve bore in any lateral direction having a component perpendicular to the rod axis in response to a lateral force on the block from any lateral direction to prevent substantial lateral movement between the bushing and the sleeve and to guide the rod within a controlled sliding path within the bore, the bushing also having a flexible spring portion biased with a biasing force against a portion of the sleeve for resisting movement between the sleeve and the rod, the sleeve including at least one longitudinal guide rail projecting inwardly into the bore, wherein the spring portion contacts the guide rail, and wherein the guide rail includes a ramp portion for flexing the spring portion in response to a lateral offset of the busing such that the bushing resists the lateral offset.

* * * * *

UNITED STATES PATENT AND TRADEMARK OFFICE
CERTIFICATE OF CORRECTION

PATENT NO. : 5,249,881

DATED : October 5, 1993

INVENTOR(S) : George K. Austin et al.

It is certified that error appears in the above-indentified patent and that said Letters Patent is hereby corrected as shown below:

TITLE PAGE

In the References Cited:

U.S. Patent Documents, "11-1990" should be --11-1970--.

Column 2, line 1, "an telescoping" should be --a telescoping--;

Column 2, line 40, "MoSz" should be --$MoS_2$--;

Column 4, line 62, "the firs" should be --the first--;

Column 5, line 34, "the external surface" should be --the surface;

Column 6, line 15, "slidably" should be --slidable--; and

UNITED STATES PATENT AND TRADEMARK OFFICE
CERTIFICATE OF CORRECTION

PATENT NO. : 5,249,881
DATED : October 5, 1993
INVENTOR(S) : George K. Austin et al.

It is certified that error appears in the above-indentified patent and that said Letters Patent is hereby corrected as shown below:

Column 6, lines 38, "busing" should be --bushing--.

Signed and Sealed this

Thirteenth Day of September, 1994

Attest:

BRUCE LEHMAN

Attesting Officer      Commissioner of Patents and Trademarks